(12) United States Patent
Polido et al.

(10) Patent No.: US 11,492,215 B1
(45) Date of Patent: Nov. 8, 2022

(54) CONCENTRIC SUCTION CUP TOOLS WITH PARALLEL PISTONS

(71) Applicant: Amazon Technologies, Inc., Seattle, WA (US)

(72) Inventors: Felipe De Arruda Camargo Polido, North Reading, MA (US); Timothy G. Dietz, Middlesex, MA (US); Michael Bruehwiler, Cambridge, MA (US); Kevin Sweeney, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 66 days.

(21) Appl. No.: 16/874,211

(22) Filed: May 14, 2020

(51) Int. Cl.
| | |
|---|---|
| *B25J 15/06* | (2006.01) |
| *B65G 61/00* | (2006.01) |
| *B65G 1/137* | (2006.01) |
| *B25J 9/16* | (2006.01) |
| *B25J 18/02* | (2006.01) |

(52) U.S. Cl.
CPC ............ *B65G 61/00* (2013.01); *B25J 9/1612* (2013.01); *B25J 15/0616* (2013.01); *B25J 15/0625* (2013.01); *B25J 15/0658* (2013.01); *B25J 18/025* (2013.01); *B65G 1/1373* (2013.01)

(58) Field of Classification Search
CPC .. B25J 9/1612; B25J 15/0625; B25J 15/0658; B25J 18/025; B65G 1/1373; B65G 47/911; B65G 47/918; B65G 61/00; B66C 1/0237; B66C 1/0243
See application file for complete search history.

(56) References Cited

U.S. PATENT DOCUMENTS

| | | | | |
|---|---|---|---|---|
| 8,944,481 | B2* | 2/2015 | Collado | B25J 15/0061 294/65 |
| 9,937,628 | B2* | 4/2018 | Werner | B25J 15/04 |
| 10,611,037 | B1* | 4/2020 | Polido | B25J 15/0061 |
| 10,611,580 | B1* | 4/2020 | Polido | B65G 47/912 |
| 2009/0028681 | A1* | 1/2009 | Huang | B25J 15/0616 414/590 |
| 2015/0063972 | A1* | 3/2015 | Girtman | B25J 15/0052 414/796.9 |
| 2019/0030730 | A1* | 1/2019 | Tanaka | B25J 9/1697 |
| 2020/0262069 | A1* | 8/2020 | Douglas | B25J 19/02 |
| 2021/0107106 | A1* | 4/2021 | Haruna | B25J 15/0616 |
| 2021/0178607 | A1* | 6/2021 | Saadat | B25J 15/045 |

* cited by examiner

*Primary Examiner* — Dean J Kramer
(74) *Attorney, Agent, or Firm* — Eversheds Sutherland (US) LLP

(57) ABSTRACT

Systems, methods, and computer-readable media are disclosed for concentric suction cup tools with parallel pistons. In one embodiment, an example picking assembly may include a first piston subassembly with a first air cylinder, a first sliding rail that slides relative to the first air cylinder, and a first suction cup. The example picking assembly may include a second piston subassembly comprising a second air cylinder, a second sliding rail that slides relative to the second air cylinder, and a second suction cup, where the first and second piston subassemblies may be configured to independently actuate from a retracted position to an extended position. The example picking assembly may include a first guide plate with a first aperture for the first piston subassembly and a second aperture for the second piston subassembly, a shell that forms a housing for the picking assembly, and an airflow coupler.

18 Claims, 10 Drawing Sheets

CONCENTRIC SUCTION CUP TOOLS WITH PARALLEL PISTONS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
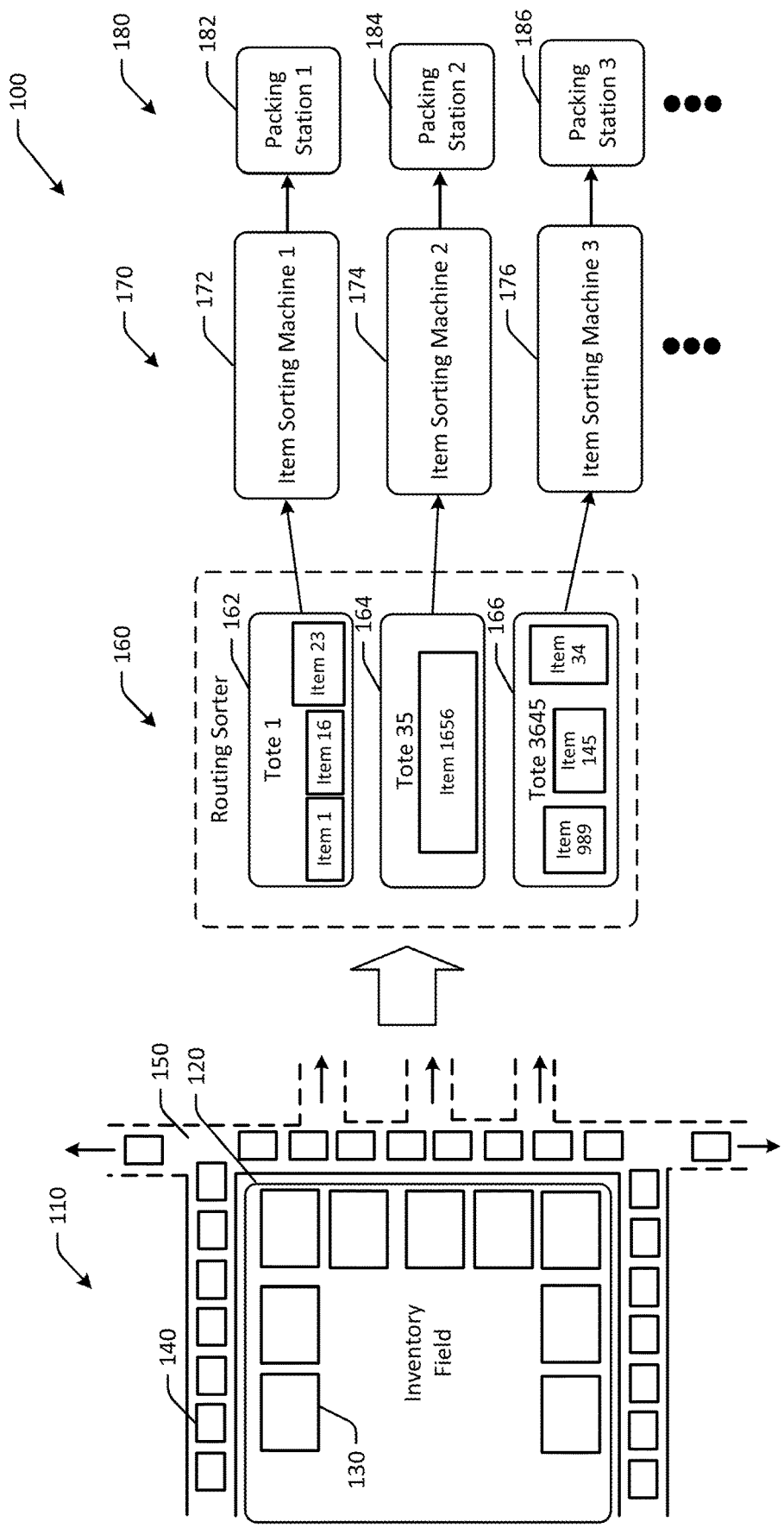
FIG. 1 is a hybrid schematic illustration of an example use case for concentric suction cup tools with parallel pistons and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, may be difficult depending on a type of packaging in which the item comes with. Humans may be able to manually handle individual items with ease. However, robotic handling of individual items may require various levels of dexterity. In addition, using a robot or other machine to grasp an item in a cluttered environment, such as a box or tote with multiple items inside, may be difficult to achieve reliably using mechanical systems.

Embodiments of the disclosure include methods and systems for automated handling of items and objects regardless of packaging that may improve processing and fulfillment of orders, or other object aggregation tasks. Certain embodiments include robotic arms with picking assemblies that use concentric suction cup tools with parallel pistons in conjunction with vacuum suction to pick up and/or release, or otherwise handle, objects, so as to increase throughput and speed of object handling. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for concentric suction cup tools with parallel pistons and an example process flow in accordance with one or more embodiments of the disclosure. Although discussed in the context of online orders, other embodiments may be directed to any suitable use case where objects are picked and released, such as instances where objects are picked from inventory, placed into containers, removed from containers for sorting, and so forth.

In FIG. 1, a fulfillment center may include an inventory field 110, a routing sorter 160, one or more item sorting machines 170, and one or more packing stations 180. The inventory field 110 may be include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. For example, concentric suction cup tools with parallel pistons may be used to pick objects from inventory containers and to place the retrieved objects into containers. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include concentric suction cup tools with parallel pistons, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of objects is used, such as to pick items from inventory, place items in totes, remove items from totes, place items into bins, remove items from bins, place items into boxes for shipping, and so forth, concentric suction cup tools with parallel pistons as described herein may be used. As a result, manual effort can be redirected to other tasks.

Embodiments of the disclosure include concentric suction cup tools with parallel pistons. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Unlike other suction-based grippers, the concentric suction cup tools with parallel pistons described herein may accurately grasp targeted items in cluttered environments, regardless of an amount of an item available for grasping, and may provide repeatable performance over an increased lifetime resulting from robust design and incorporation of a load bearing shell. In some embodiments, compliant suction elements may be used in a parallel architecture that increases a compliant to tool length ratio, increases the extending element stiffness, and increases tool life time (e.g., such as about 4.5 million cycles). In addition, embodiments may include a universal adapter plate for a quick mechanical connection between different tools and/or vacuum sources.

Embodiments of the disclosure may therefore provide a robust object handling system that improves functionality and flexibility with respect to the types of objects that can be handled using robotic or other mechanical equipment. Some embodiments may include a concentric design, where multiple concentric parallel piston subassemblies are arranged to handle a wider range of item sizes, and other embodiments may include a concentric array design, which may be configured to handle a wide range of item shapes and sizes.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2A:
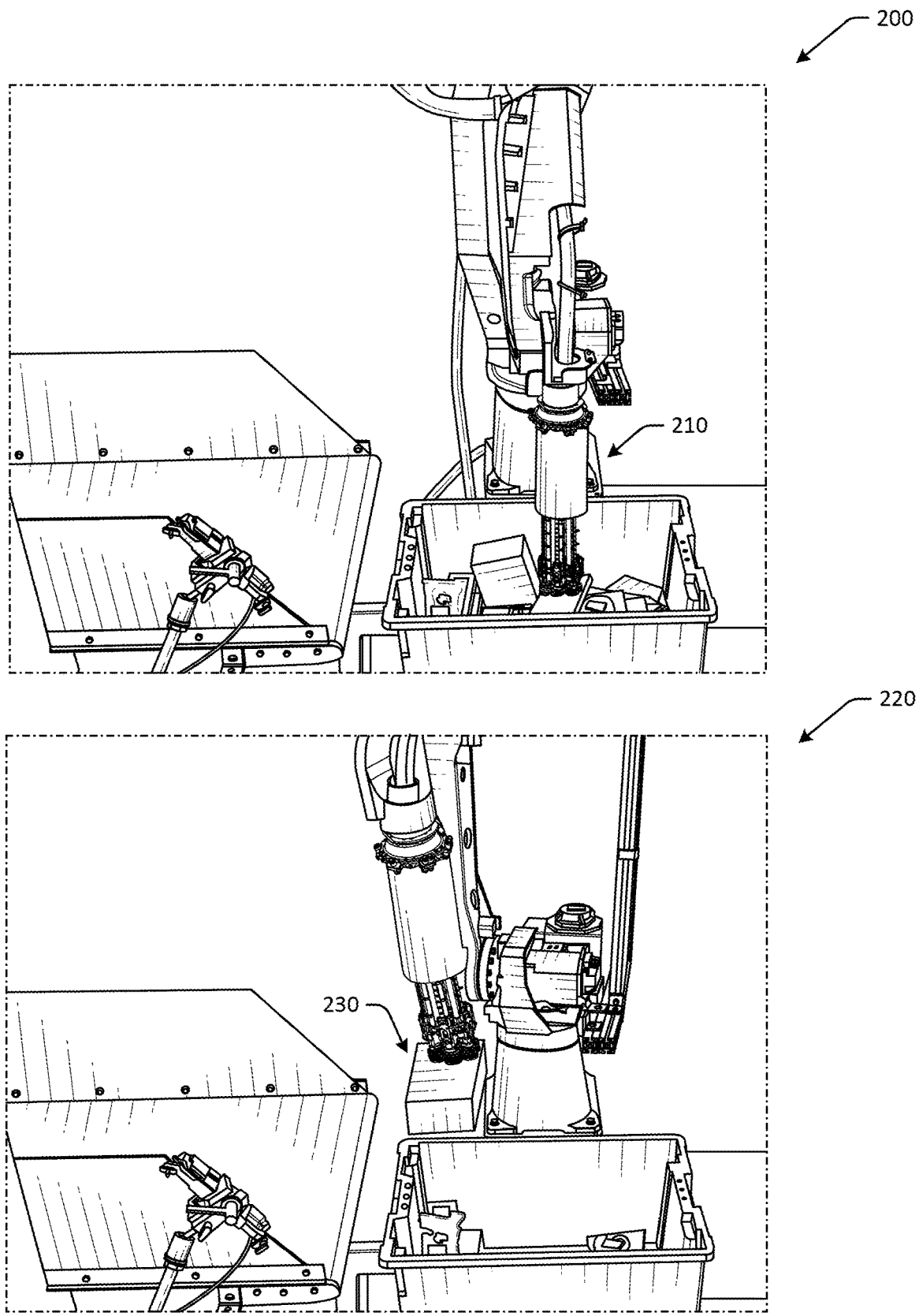
FIGS. 2A-2B are schematic illustrations of example use cases for concentric suction cup tools with parallel pistons in accordance with one or more embodiments of the disclosure.
Figure 2B:
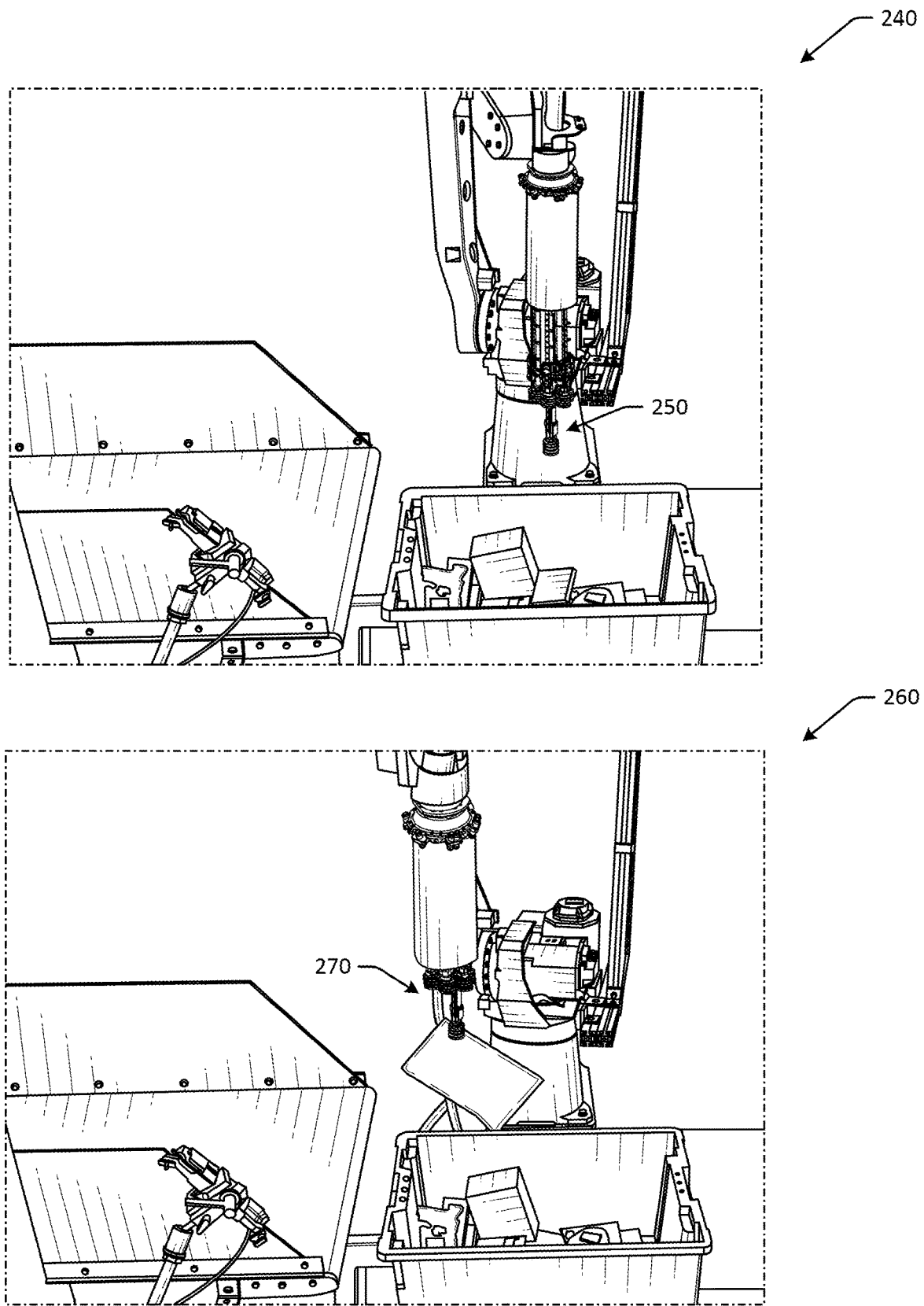

FIGS. 2A-2B are schematic illustrations of example use cases for concentric suction cup tools with parallel pistons in accordance with one or more embodiments of the disclosure. Other embodiments may include additional or fewer components. The illustration of FIGS. 2A-2B may not be to scale, and may not be illustrated to scale with respect to other figures. The concentric suction cup tools with parallel pistons illustrated in FIGS. 2A-2B may be the picking assemblies discussed with respect to FIG. 1.

In FIG. 2A, a robotic picking assembly may be used to pick up objects of various form factors and with different packaging materials (e.g., loose plastic bag packaging, boxes, etc.), as well as objects of different sizes and shapes, such as cylindrical objects, round objects, etc. Typically, picking up such different items using the same end-of-arm-tool or picking assembly may be difficult due to a number of factors, such as weight shifting during movement of the object (e.g., movement of an object in a loose bag packaging, leading to a change in center of gravity, etc. for the object). In addition, alignment of a suction cup in a typical picking assembly may be critical. Unlike typical picking assemblies, robotic picking assemblies described herein may not need to be aligned with objects in any particular manner, and may pick up such objects regardless of the loose bag packaging, and regardless of a shape or size of the object. In addition, embodiments may accurately grasp objects in cluttered environments, such as a container or bin with multiple items inside.

To accurately and repeatedly grasp items in cluttered environments, embodiments may include picking tools with concentric suction cups and parallel pistons. Individual pistons may be actuated depending on an amount of a target item (e.g., an item that is targeted for grasping, etc.) that is exposed, the shape and/or size of the target item, etc. The individual pistons may provide added flexibility in movement of the robotic arm or other device to which the picking assembly is coupled, such as a gantry or other device. Different shapes and configurations may be formed via the individual pistons that are actuated to an extended position. For example, a row of piston subassemblies and corresponding suction cups may be extended, an arc, semicircle, or circle of piston subassemblies and corresponding suction cups may be extended, individual piston subassemblies and corresponding suction cups may be extended, and so forth, based at least in part on imaging data indicative of a positioning and/or exposure of a target item (e.g., for instances where the target item is in a cluttered environment, etc.).

FIGS. 2A-2B depict a picking assembly with concentric suction cups parallel pistons. In FIG. 2A, at a first instance 200, a picking assembly 210 may include a number of piston subassemblies, each of which may have a suction cup disposed at a distal end. The piston subassemblies may be arranged in a circular configuration with another piston subassembly disposed in the center, so as to form a concentric arrangement. Individual piston subassemblies may be actuated outwards relative to a shell to grasp an item. For example, a camera system may be used to image a target item. Based at least in part on the imaging, one or more of the piston subassemblies may be selected or otherwise determined for actuation from a retracted position within the shell of the picking assembly to an extended position, as illustrated in FIG. 2A at the first instance 200. In the example of FIG. 2A, the picking assembly 210 is depicted with each of the piston subassemblies in an extended position. At a second instance 220, the picking assembly 210 is depicted grasping a box 230 using the extended piston subassemblies. The picking assembly 210 may be coupled to a vacuum suction system that may provide vacuum flow or negative air pressure to the individual piston subassemblies. The negative air pressure may flow through the suction cups coupled to the individual piston subassemblies, which may provide a force that can be used to grasp and lift the box 230 out of a container. To release the box 230, for example onto a conveyor belt, the negative air pressure may be reduced and/or positive air pressure may be applied.

To actuate individual piston subassemblies, the individual piston subassemblies may include air chambers that may be used to actuate a portion of the piston subassembly outwards from the shell, and to retract the portion of the piston subassembly into the shell. The air chambers may use air provided from the vacuum suction system or a different air flow. The air chambers may act as pistons for the piston subassemblies.

In FIG. 2B, at a first instance 240, a single piston subassembly 250 may be actuated at the picking assembly. The single piston subassembly 250 may provide more granular targeting, which may be effective in grasping objects that are in a cluttered space, such as an object partially underneath another object. The single piston subassembly 250 may be a center piston subassembly (e.g., center of the concentric arrangement, etc.) or a different piston subassembly. The single piston subassembly 250 may be extended prior to approaching the target item. At a second instance 260, a target item of a bag 270, such as a bag of chips, a loose bag packaging with an item inside, etc. may be grasped by the single piston subassembly 250 and lifted. To release the bag 270, the negative air pressure may be reduced, and/or positive air pressure may be provided via the suction cup of the single piston subassembly 250.

The robotic picking assembly of FIGS. 2A-2B may be positioned over or adjacent to a target object, and may be configured to pick up, move, and release objects. The robotic picking assembly may include a robotic arm and a picking assembly coupled to the robotic arm. The robotic arm may position the picking assembly roughly over or adjacent to the target object. The picking assembly may not need to be positioned in any specific location (e.g., a center, etc.) over the target object.

The robotic picking assembly may therefore be used to retrieve objects of different sizes, shapes, form factors, and/or having different types of packaging from one location to another without dropping or losing a grip on the object. Although certain example objects are illustrated in FIGS. 2A-2B, any suitable object can be picked up by embodiments of the disclosure, including off-center flat objects, round objects, long narrow objects, circular objects, and so forth.

Accordingly, some embodiments may include a controller configured to cause the picking assembly to pick up an object by positioning the picking assembly adjacent to an object (such as over a center, over a peripheral edge, or over another portion of the object), causing the vacuum suction system to provide negative air pressure, actuating the picking assembly from a raised position to a lowered position, and causing the picking assembly to move upwards and/or in a lateral direction. For example, the picking assembly may be coupled to a computer system or a controller, which may or may not be the same controller of the robotic arm. The controller may be configured to cause the picking assembly to pick up the item by determining a subset of piston subassemblies to actuate, causing the subset of piston subassemblies to actuate to the extended position, positioning the subset of piston subassemblies adjacent to the item, causing the vacuum suction system to provide negative air pressure, and causing the picking assembly to move upwards.

Figure 3:
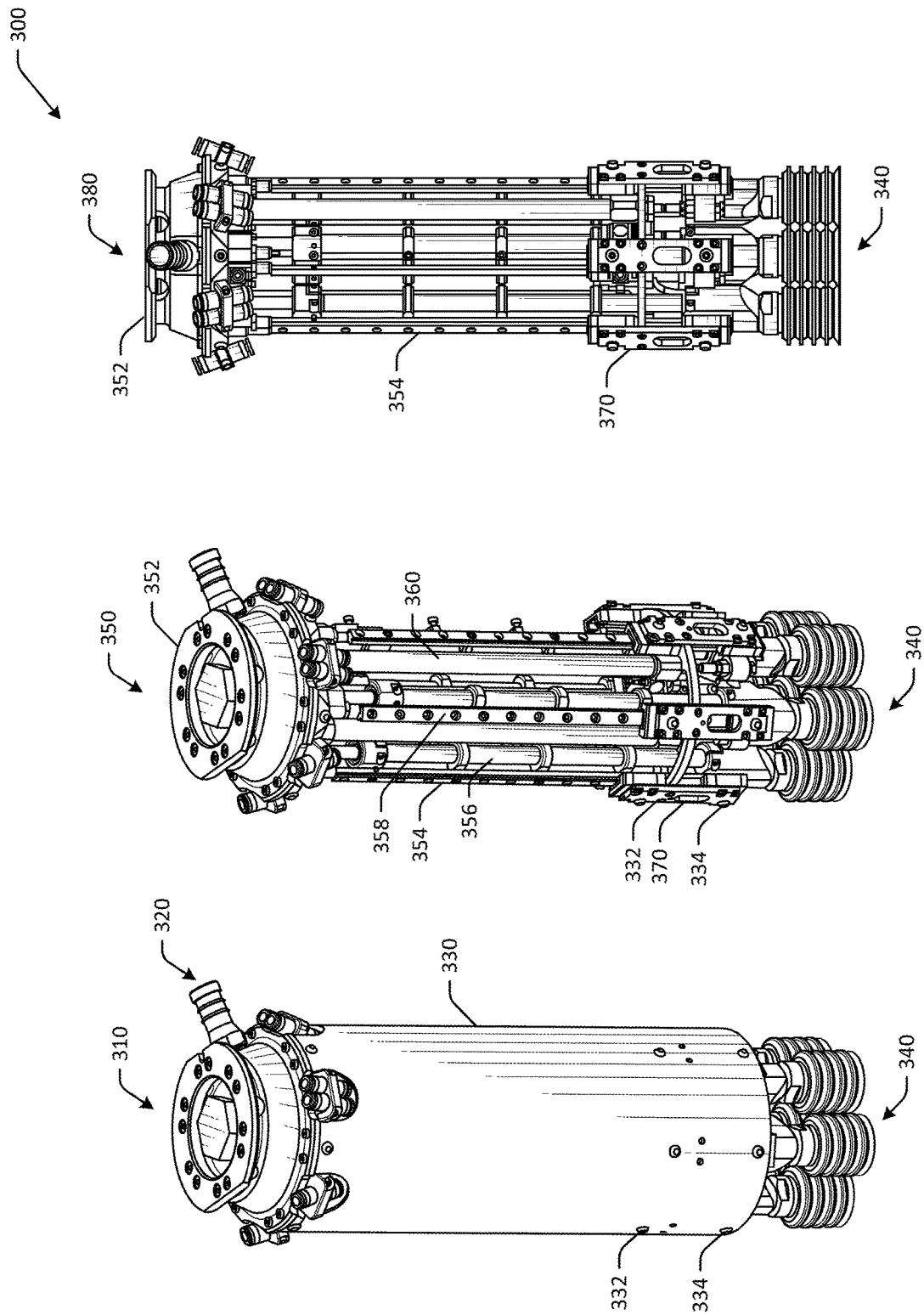
FIG. 3 is a schematic illustration of an example concentric suction cup picking assembly with parallel pistons in accordance with one or more embodiments of the disclosure.

FIG. 3 is a schematic illustration of an example concentric suction cup picking assembly with parallel pistons 300 in accordance with one or more embodiments of the disclosure. Other embodiments may include additional or fewer components. The illustration of FIG. 3 is not to scale, and may not be illustrated to scale with respect to other figures. The picking assembly illustrated in FIG. 3 may be the same picking assembly and/or concentric suction cup tools with parallel pistons discussed with respect to FIGS. 1-2.

In FIG. 3, the concentric suction cup picking assembly with parallel pistons 300 is depicted in a first perspective view 310 with a shell 330, a second perspective view 350 without the shell 330, and a third front view 380 without the shell 330. As illustrated, the concentric suction cup picking assembly with parallel pistons 300 may include a number of individual piston subassemblies that may be arranged or otherwise disposed in a parallel arrangement. FIG. 3 depicts the parallel pistons in a retracted position.

The concentric suction cup picking assembly with parallel pistons 300 may be a picking assembly that includes the shell 330. The shell 330 may be formed of carbon fiber, plastic, aluminum, a composite material, or a different type of high strength low weight material and may be coupled to one or more guides 370 disposed inside the shell 330. The shell 330 may be coupled using one or more screws or other components, such as first screw 332 and second screw 334. In some embodiments, the shell 330 may not be directly coupled to any of the piston subassemblies. The shell 330 may be a load bearing component, which may reduce stress on the piston subassemblies, and may improve a lifetime of the concentric suction cup picking assembly with parallel pistons 300. The picking assembly may include any number of suction cups 340. The suction cups 340 may be disposed adjacent to a lower end of the shell 330 in a retracted position. In other embodiments, the suction cup 340 may be disposed inside the shell 330 in the retracted position. The suction cups 340 may be compliant components that may be used to grasp objects of different shapes, sizes, and materials. Each individual suction cup 340 may have its own compliance to assist with item deformation. As a result, positioning of the picking assembly during picking operations may be less critical. The picking assembly may be lightweight to improve repeatability. For example, the picking assembly may have a total weight of less than about 5 pounds, and individual piston subassemblies may have a weight of about 100 grams. In addition, the lifting capacity of the system is improved, as a reduced weight increases the amount of mass the robot can lift (e.g., the total lift capacity may be unchanged, but a heavier item can be lifted due to a reduced weight of the picking assembly, etc.) The shell 330 may improve rigidity of the picking assembly and may resist shearing or twisting of the piston subassemblies. The picking assembly may include a number of airflow system connection adapters, such as a first adapter 320, and a second adapter 352 disposed at an upper end of the picking assembly. The picking assembly may have an extendable length that is about 50% greater than a retracted length. For example, a retracted length may be about 300 millimeters, and an extended length may be about 450 millimeters, or about 18 inches, for an extendability of about 50%. Due to improved rigidity and structural integrity of the picking assembly, the picking assembly may have a weight-to-extended length ratio of between about 0.25 lb/inch and about 0.30 lb/inch. For example, at a weight of 5 pounds and extended length of 18 inches, the picking assembly may have a weight-to-extended length ratio of 0.28 lb/inch. In an example embodiment, the picking assembly may have a diameter of between about 4 inches and about 8 inches, which may correspond to a density proxy of the picking assembly. The improved strength and rigidity may provide the ability to lift relatively heavy items without damaging the picking assembly. In an example, objects weighing over 50 pounds may be lifted and moved using the picking assembly while maintaining a slim profile and relatively tight spacing between adjacent suction cups and/or piston subassemblies. The reduced weight also improves repeatability and lifespan of the picking assembly, as well as the available lifting capacity of the system.

As depicted in the second perspective view 350, the picking assembly may include a first piston subassembly that has a first air cylinder 356, a first sliding rail 354 that slides outwards of the shell 330 relative to the first air cylinder 356, and a first suction cup. The first piston subassembly may be configured to independently actuate from a retracted position to an extended position. The picking assembly may include a second piston subassembly that has a second air cylinder 360, a second sliding rail 358 that slides relative to the second air cylinder 360, and a second suction cup, where the second piston subassembly may also be configured to independently actuate from the retracted position to the extended position. Any number of piston subassemblies may be included. The respective air chambers may be fixed relative to the suction cups 340 and may be load bearing components.

The first guide plate 370 may be configured to guide the respective piston subassemblies and may have a first aperture for the first piston subassembly and a second aperture for the second piston subassembly, and so forth. The first guide plate 370 may be coupled to the piston subassemblies and/or the shell 330. The shell 330 may form a housing for the picking assembly. The first air cylinder 356 may be configured to actuate the first piston subassembly responsive to air pressure at the first air cylinder 356, and the second air cylinder 360 may be configured to actuate the second piston subassembly responsive to air pressure at the second air cylinder 360. The first air cylinder 356 and the second air cylinder 360 may be load bearing air cylinders, and the shell 330 may be a load bearing shell. In some embodiments, some of the piston subassemblies, such as those along a perimeter of the picking assembly as determined in a bottom view may include one or more restrictors configured to restrict airflow, so as to direct airflow to one or more center suction cups.

The concentric suction cup picking assembly with parallel pistons 300 may be coupled to a robotic arm or other device configured to move the picking assembly from a first location to a second location. The concentric suction cup picking assembly with parallel pistons 300 may be coupled to a vacuum suction system that is configured to generate negative pressure to pick up an item, and positive pressure to release the item.

Figure 4:
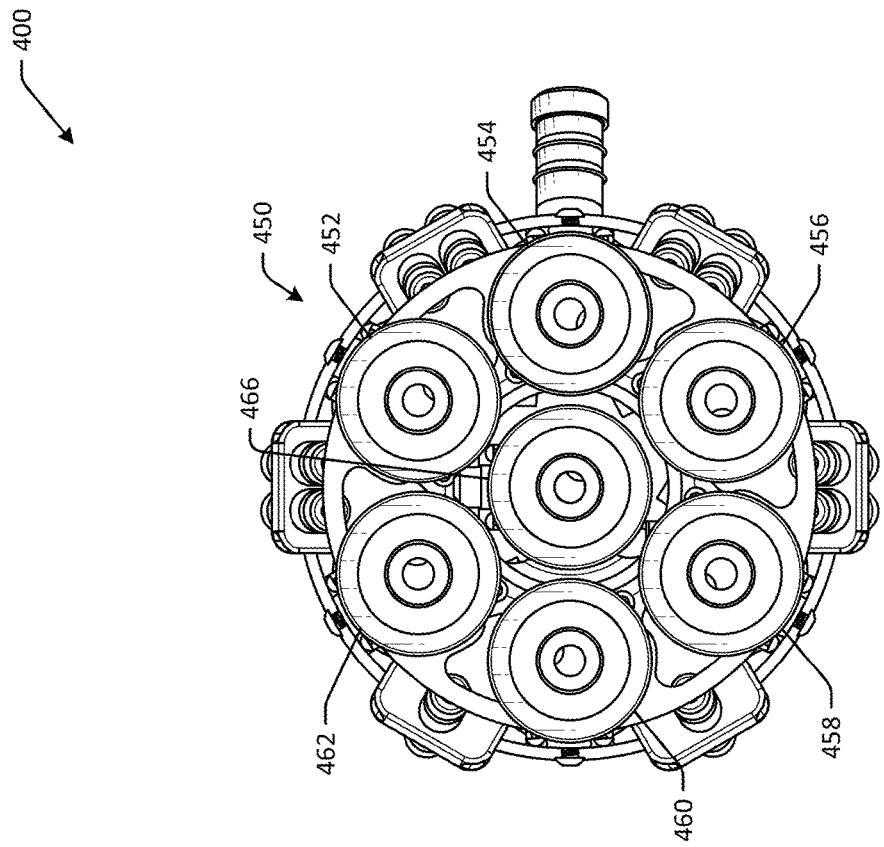
FIG. 4 is a schematic illustration of a picking assembly in top and bottom views in accordance with one or more embodiments of the disclosure.
Figure 4:
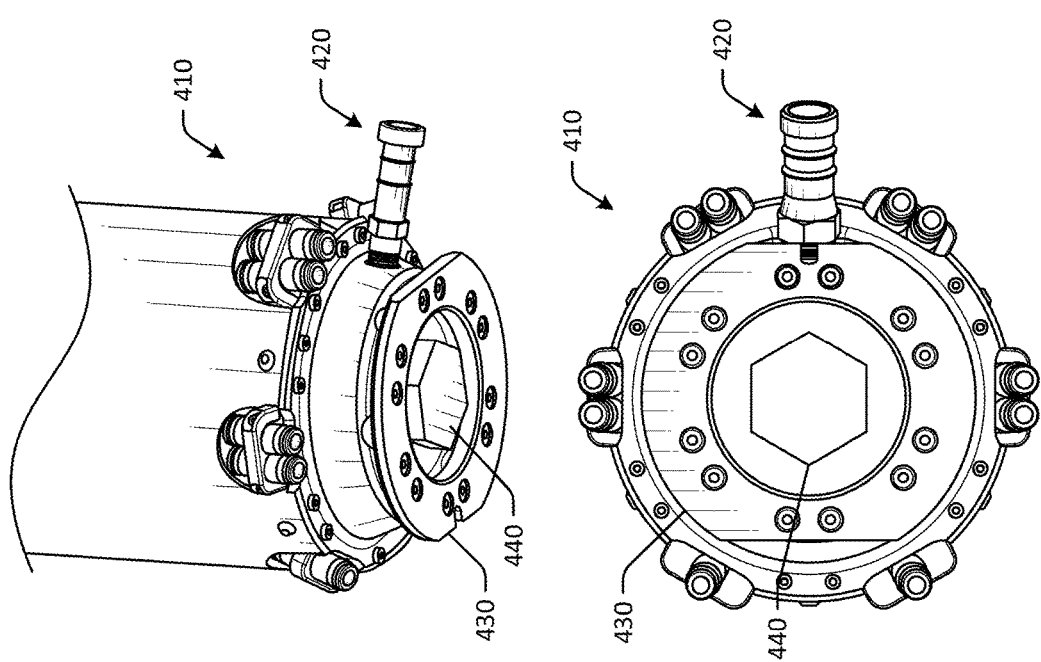

FIG. 4 is a schematic illustration of a picking assembly 400 in top and bottom views in accordance with one or more embodiments of the disclosure. Other embodiments may include additional or fewer components. The illustration of FIG. 4 is not to scale, and may not be illustrated to scale with respect to other figures. The components illustrated in FIG. 4 may be components of the picking assemblies discussed with respect to FIGS. 1-3.

In FIG. 4, a top portion 410 of the picking assembly 400 is depicted in a bottom view and bottom perspective view. The picking assembly 400 may include a first airflow coupling adapter 430. The first airflow coupling adapter 430 may have a first configuration, such as a first geometry, first dimension(s), a first connector type, and so forth. In the illustrated embodiment, the first airflow coupling adapter 430 may be disposed at a distal end of the picking assembly 400, such as at a top end of the picking assembly 400. The first airflow coupling adapter 430 may therefore couple an airflow source to the picking assembly 400 at a top end of the picking assembly 400. In some embodiments, a vacuum source or vacuum system may be coupled to the picking assembly 400 at the first airflow coupling adapter 430. A bolt 440 may be disposed in a center of the first airflow coupling adapter 430, and air may flow around the bolt 440.

The picking assembly 400 may include a second airflow coupling adapter 420. The second airflow coupling adapter 420 may have a second configuration, such as a second geometry, second dimension(s), a second connector type, and so forth. In the illustrated embodiment, the second airflow coupling adapter 420 may be disposed adjacent to a distal end of the picking assembly 400, such adjacent to the top end of the picking assembly 400. The second airflow coupling adapter 420 may therefore couple an airflow source to the picking assembly 400 near a top end of the picking assembly 400. In some embodiments, a vacuum source or vacuum system may be coupled to the picking assembly 400 at the second airflow coupling adapter 420. In one example, the second airflow coupling adapter 420 may extend from the distal end of the picking assembly 400, as depicted in FIG. 4.

The respective first airflow coupling adapter 430 and second airflow coupling adapter 420 may be used to couple the picking assembly 400 to one or more sources of air flow, such as to provide positive or negative air pressure. In some embodiments, only one coupling adapter may be used at a time, while in other embodiments, both coupling adapters may be used at the same time. Other embodiments may include additional or fewer, or different types of, coupling adapters.

A bottom portion 450 of the picking assembly 400 is depicted in a bottom view. As illustrated in the bottom view, the picking assembly 400 may include a number of piston subassemblies arranged in a circular, and sometimes concentric, arrangement, as illustrated. In other embodiments, the piston subassemblies may be arranged so as to surround or otherwise encircle a center piston subassembly, and may form various arrangements, such as a circular arrangement, a triangular arrangement, a rectangular arrangement, a linear arrangement, and so forth. Some or all, or each, of the piston subassemblies may be coupled to respective suction cups.

For example, the picking assembly 400 may include a first piston subassembly that includes a first air cylinder, a first sliding rail that slides relative to the first air cylinder, and a first suction cup 466. The first piston subassembly may be configured to independently actuate from a retracted position to an extended position. The first piston subassembly may be disposed in a center of the concentric arrangement illustrated in FIG. 4.

The picking assembly 400 may include a second piston subassembly that includes a second air cylinder, a second sliding rail that slides relative to the second air cylinder, and a second suction cup 452, where the second piston subassembly is configured to independently actuate from the retracted position to the extended position. The picking assembly 400 may include a third piston subassembly that includes a third air cylinder, a third sliding rail that slides relative to the third air cylinder, and a third suction cup 454, where the third piston subassembly is configured to independently actuate from the retracted position to the extended position. The picking assembly 400 may include a fourth piston subassembly that includes a fourth air cylinder, a fourth sliding rail that slides relative to the fourth air cylinder, and a fourth suction cup 456, where the fourth piston subassembly is configured to independently actuate from the retracted position to the extended position. The picking assembly 400 may include a fifth piston subassembly that includes a fifth air cylinder, a fifth sliding rail that slides relative to the fifth air cylinder, and a fifth suction cup 458, where the fifth piston subassembly is configured to independently actuate from the retracted position to the extended position. The picking assembly 400 may include a sixth piston subassembly that includes a sixth air cylinder, a sixth sliding rail that slides relative to the sixth air cylinder, and a sixth suction cup 460, where the sixth piston subassembly is configured to independently actuate from the retracted position to the extended position. The picking assembly 400 may include a seventh piston subassembly that includes a seventh air cylinder, a seventh sliding rail that slides relative to the seventh air cylinder, and a seventh suction cup 462, where the seventh piston subassembly is configured to independently actuate from the retracted position to the extended position.

Although illustrated as a single piston subassembly disposed in a center surrounded by six piston subassemblies disposed in a circular arrangement about the center piston subassembly, any number of piston subassemblies may be used, and any number of circular formations may be used. Other configurations, such as arrays, rectangles, random patterns, and other configurations of piston subassemblies may be included.

In some embodiments, the center piston subassembly may not include a restrictor (e.g., a disc or other component that restricts airflow, etc.), while other non-center piston subassemblies may include one or more restrictors configured to restrict airflow, so as to ensure airflow at the center piston subassembly. In an example embodiment, some or all of the set of piston subassemblies surrounding the center piston subassembly in FIG. 3 may include individual restrictors to restrict air flow to the respective suction cups of the set of piston subassemblies.

Although a single picking assembly is illustrated in FIG. 4, in some embodiments, more than one picking assembly may be used in conjunction with each other to pick up objects. For example, some embodiments may include multiple picking assemblies arranged in an array or in a vertically offset arrangement to pick up objects. For example, the picking assembly illustrated in FIG. 4 may be a first picking assembly, and the robotic picking assembly may also include a second picking assembly disposed adjacent to the first picking assembly, and a third picking assembly disposed adjacent to the first picking assembly. The second picking assembly and/or the third picking assembly are in an offset vertical position with respect to the first picking assembly. Such an arrangement may improve the ability of the device to pick up objects with non-uniform surface features, such as heavy bags of cat food. In another example, the picking assembly illustrated in FIG. 4 may be a first picking assembly, and the robotic picking assembly may include a second picking assembly disposed adjacent to the first picking assembly, and a third picking assembly disposed adjacent to the first picking assembly. The second picking assembly and/or the third picking assembly may be arranged around the first picking assembly in a concentric arrangement, a circular arrangement, an elliptical arrangement, an oval arrangement, a rectangular arrangement, and the like.

Figure 5A:
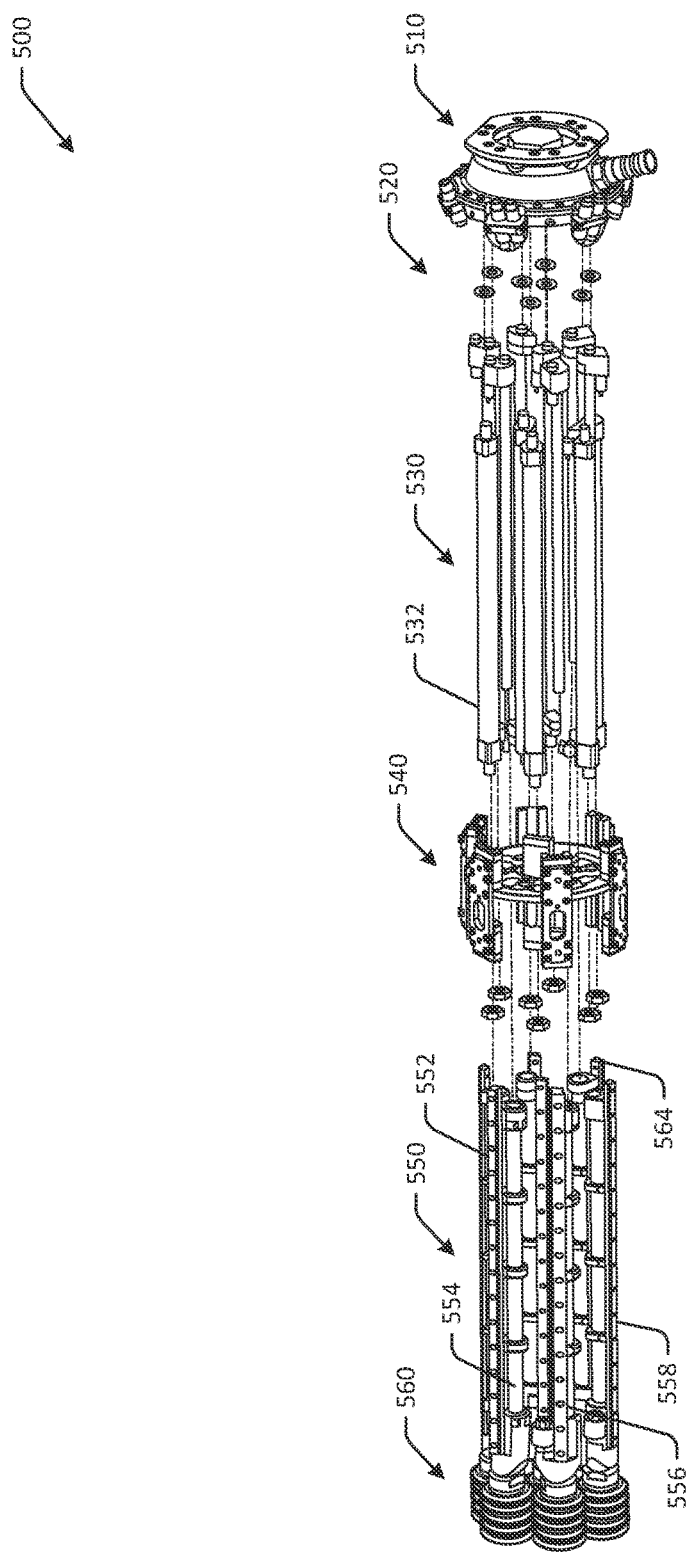
FIG. 5A is a schematic illustration of an example picking assembly without a shell in an exploded view in accordance with one or more embodiments of the disclosure.

FIG. 5A is a schematic illustration of an example picking assembly 500 in an exploded view in accordance with one or more embodiments of the disclosure. Other embodiments may include additional or fewer components. The illustration of FIG. 5A is not to scale, and may not be illustrated to scale with respect to other figures. The illustration of FIG. 5A is not to scale, and may not be illustrated to scale with respect to other figures. The components illustrated in FIG. 5A may be components of the picking assemblies discussed with respect to FIGS. 1-4.

In FIG. 5A, the picking assembly 500 is depicted in an exploded view. The picking assembly 500 may be a robotic picking assembly and may be coupled to a robotic arm and/or a vacuum suction system configured to provide positive air pressure and negative air pressure. The picking assembly 500 may be configured to pick up and release objects. In the illustrated embodiment, the picking assembly 500 may include an airflow coupling adapter 510 that may include one or more connections used to couple the picking assembly 500 to a vacuum source or other airflow source.

The picking assembly 500 may include a number of piston subassemblies, each of which includes an air chamber 530 that may be used to actuate the respective piston subassembly. The air chambers 530 may be coupled to the airflow coupling adapter 510 using coupling mechanism 520, which may include bolts, nuts, screws, guides, or other mechanisms. The individual air chambers 530 may include pneumatic tubes 532. One or more guides 540 may be used to position the respective piston subassemblies. An outer shell (not shown) of the picking assembly 500 may be coupled to the guide 540. The respective piston subassemblies may include one or more extendable components 550 that may extend when the piston subassembly is in an extended position. In some embodiments, the extendable components 550 may slide or otherwise move with respect to the air chambers 530 when the piston subassembly is in an extended position. The extendable components 550 for each of the respective piston subassemblies may include a sliding rail (e.g., a first sliding rail 552, a second sliding rail 556, a third sliding rail 558, a fourth sliding rail 564, etc.) and a respective vacuum tube, such as vacuum tube 554 that corresponds to the first sliding rail, that may provide suction at a respective suction cup (e.g., suction cup 560 that corresponds to the first piston subassembly 570) coupled to an end of the piston subassembly.

In some embodiments, the picking assembly 500 may include a center piston subassembly that includes a first sliding rail, a first suction cup coupled to the first sliding rail, and a first air cylinder configured to actuate the center piston subassembly from a retracted position to an extended position. The first sliding rail may slide relative to the first air cylinder. The picking assembly 500 may include a set of piston subassemblies arranged in a circular arrangement around the center piston subassembly, each piston subassembly in the set of piston subassemblies having a sliding rail, a suction cup coupled to the sliding rail, and an air cylinder configured to actuate the respective piston subassembly from a retracted position to an extended position. The respective sliding rails may slide relative to the respective air cylinders. The guide 540 may be a first guide plate that has individual apertures in which the center piston subassembly and the set of piston subassemblies are disposed. The first guide plate may be configured to provide a fixed distance between each of the set of piston subassemblies and the center piston subassembly. The picking assembly 500 may include a carbon fiber shell, where the center piston subassembly, the set of piston subassemblies, and the first guide plate are disposed in the carbon fiber shell. The carbon fiber shell may be coupled to the first guide plate. The picking assembly 500 may be configured to actuate individual piston subassemblies to the extended position to grasp an item, and some or all, or each, individual piston subassembly may be coupled to the vacuum suction system.

Figure 5B:
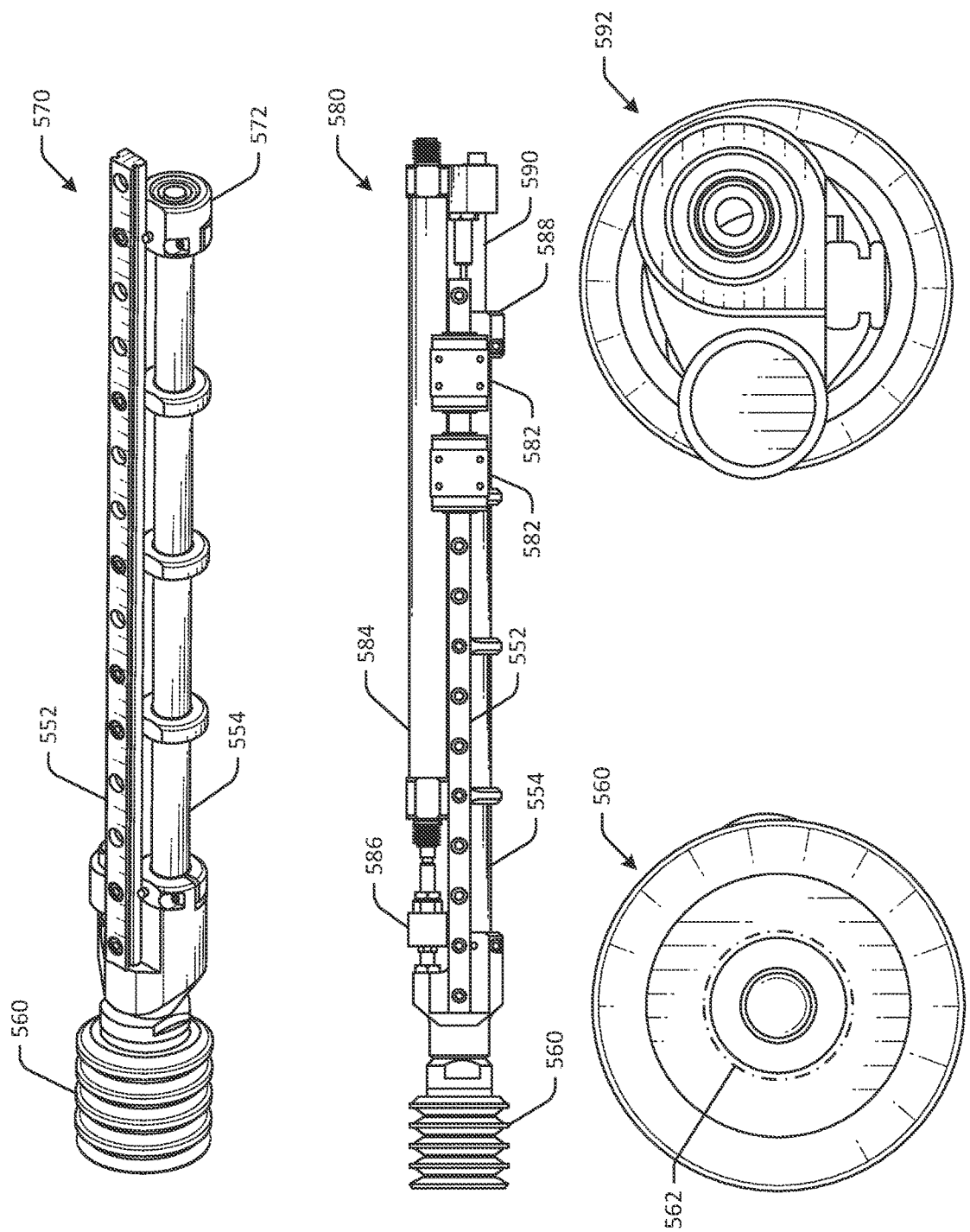
FIG. 5B is a schematic illustration of an individual piston subassembly in various views in accordance with one or more embodiments of the disclosure.

FIG. 5B is a schematic illustration of an individual piston subassembly in various views in accordance with one or more embodiments of the disclosure. Other embodiments may include additional or fewer components. The illustration of FIG. 5B is not to scale, and may not be illustrated to scale with respect to other figures. The toroidal suction gripper illustrated in FIG. 5B may be the same toroidal suction gripper discussed with respect to FIG. 5A.

In FIG. 5B, two embodiments of a piston subassembly are depicted. A first piston subassembly 570 may include a compliant suction cup 560 coupled to a distal end of a carbon fiber tube 554 that may be coupled to a vacuum system at an opposite end 572. The carbon fiber tube 554 may move with the suction cup 560 when extended and may provide vacuum suction through the suction cup 560. The carbon fiber tube 554 may be coupled to a sliding rail 552 that may slide with the carbon fiber tube 554 when the piston subassembly is in the extended position. The first piston subassembly 570 may include an air cylinder (not shown) that may be configured to impart motion to the sliding rail 552, the carbon fiber tube 554, and the compliant suction cup 560. Other materials may be used for the tube 554, such as metal, plastic, or other materials.

A second piston subassembly 580 may include the compliant suction cup 560 coupled to a distal end of a carbon fiber tube 554 that may be coupled to a vacuum system at an opposite end. The carbon fiber tube 554 may move with the suction cup 560 when extended and may provide vacuum suction through the suction cup 560. The carbon fiber tube 554 may be coupled to a sliding rail 552 that may slide with the carbon fiber tube 554 when the piston subassembly is in the extended position. The second piston subassembly 580 may include an air cylinder 584 that may be configured to impart motion to the sliding rail 552, the carbon fiber tube 554, and the compliant suction cup 560. Other materials may be used for the tube 554, such as metal, plastic, or other materials. The second piston subassembly 580 may include a floating joint 586 that prevents any non-axial loads on the air cylinder 584 and improves lifespan of the air cylinder 584. The air cylinder 584 may be a ten millimeter bore air cylinder. The second piston subassembly 580 may include one or more ball bearings 582 that may be linear recirculating ball bearings, such as stainless steel ball bearings, that are coupled to the sliding rail 552 to provide smooth motion. The second piston subassembly 580 may include a stainless steel tube 590 with an end coupling 588 mounted to the manifold that remains stationary with respect to the carbon fiber tube 554 to provide vacuum routing. The carbon fiber tube 554 may telescope with respect to the stainless steel tube 590 to move to the extended position. Other materials may be used. As illustrated in bottom views in FIG. 5B, the entire footprint of the piston subassembly 592 may fit within the diameter of the suction cup 560, providing a seamless design that allows for multiple piston subassemblies to be positioned adjacent to each other with limited spacing. As a result, picking assemblies that are lighter and more compact may be formed.

The first piston subassembly 570 and/or the second piston subassembly 580 may include air cylinders configured to actuate the piston subassembly responsive to air pressure. Air pressure or airflow to and/or from the air cylinder may be controlled using one or more valves. For example, the first piston subassembly 570 and/or the second piston subassembly 580 may include a valve configured to control airflow to the air cylinder. The first piston subassembly 570 and/or the second piston subassembly 580 may include a vacuum routing tube, such as the carbon fiber tube 554, coupled to the sliding rail 552, where the vacuum routing tube may be configured to provide suction at the suction cup 560.

Restrictors may be included in either or both the first piston subassembly 570 and/or the second piston subassembly 580. In one example, the restrictor may be a feature behind the suction cup 560 in the shape of a disk (e.g., a restrictor 562 may be in the shape of a disk, etc.), and the diameter of the center hole in each disk may influence the tool system level performance. Restrictors may be beneficial when picking up an item with only the center suction cup. In such an instance, the other suction cups may be wide open and free flowing. Without restrictors, the vacuum system may have trouble maintaining the flow rate, and the pressure at the center suction cup may not generate enough force. The restrictors may assist by increasing the negative pressure inside the whole tool, which results in a higher lift force on the center suction cup.

Figure 6:
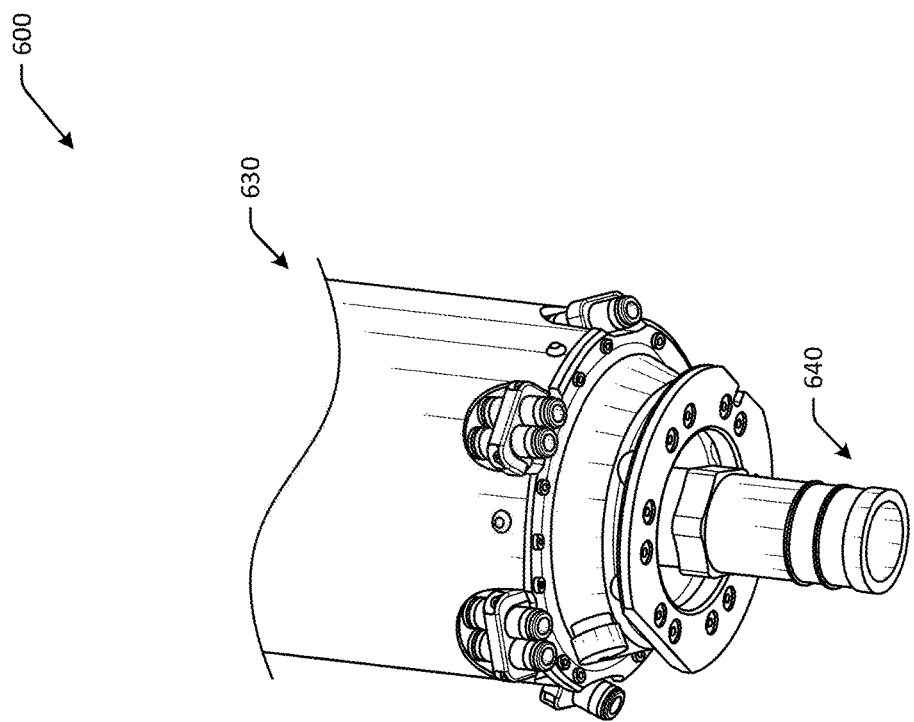
FIG. 6 is a schematic illustration of an example top guide and airflow coupling mechanism in accordance with one or more embodiments of the disclosure.
Figure 6:
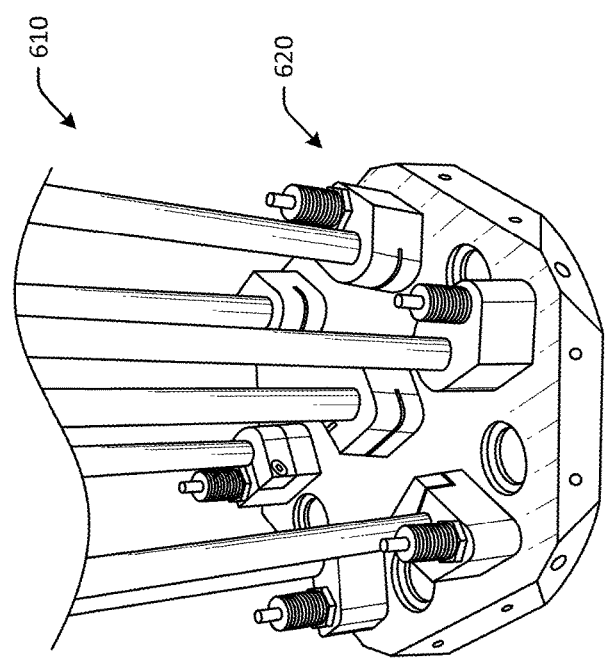

FIG. 6 is a schematic illustration of an example top guide and airflow coupling mechanism 600 in accordance with one or more embodiments of the disclosure. Other embodiments may include additional or fewer components. The illustration of FIG. 6 is not to scale, and may not be illustrated to scale with respect to other figures. The components illustrated in FIG. 6 may be components of the picking assemblies discussed with respect to FIGS. 1-5B.

In FIG. 6, a top guide component 610 is depicted in perspective view. The top guide component 610 may be disposed adjacent to an end of a picking tool, such as an upper end or a top end (top as used herein is a relative, and not absolute, positioning term). A lower side of the top guide component 610 is depicted in FIG. 6. One or more piston subassemblies 620 may be coupled to the lower side of the top guide component 610, as illustrated. In some embodiments, the piston subassemblies 620 may not actually be coupled to top guide component 610 in a fixed manner, but instead may be removably coupled in the sense that the piston subassemblies 620 may sit in corresponding recessed portions of the top guide component 610. In other embodiments, the piston subassemblies 620 may be coupled to the top guide component 610 using screws, bolts, nuts, or other coupling mechanisms. The top guide component 610 may be configured to provide positioning for the piston subassemblies 620, such that the individual piston subassemblies do not become misaligned during actuation.

An adapter plate or airflow coupling mechanism 630 is depicted in FIG. 6. The airflow coupling mechanism 630 may be disposed adjacent to an upper side of the top guide component 610. The airflow coupling mechanism 630 may have a first airflow coupling mechanism 640 that has a first configuration, such as a first connection type, a first dimension, and so forth. The airflow coupling mechanism 630 may include a second airflow coupling mechanism that has a different configuration, such as a second connection type, a second dimension, and so forth, so as to provide the ability to rapidly change vacuum suction system coupling and improve flexibility of use of the picking assembly. Any number of connections or airflow coupling mechanisms may be included.

Figure 7:
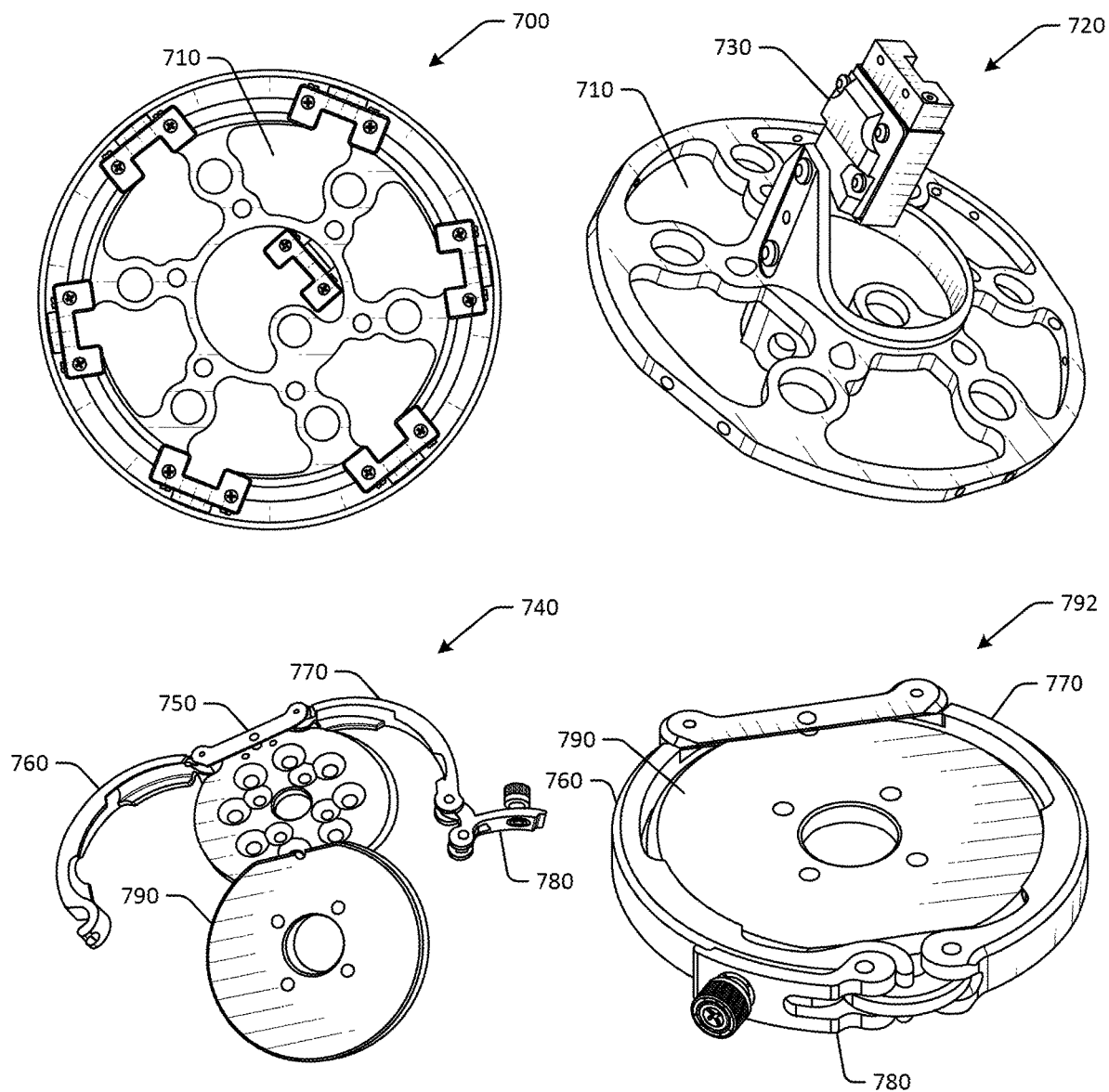
FIG. 7 is a schematic illustration of a guide component and coupling mechanism in accordance with one or more embodiments of the disclosure.

FIG. 7 is a schematic illustration of a guide component 700 and coupling mechanism 740 in accordance with one or more embodiments of the disclosure. Other embodiments may include additional or fewer components. The illustration of FIG. 7 is not to scale, and may not be illustrated to scale with respect to other figures. The components illustrated in FIG. 7 may be components of the picking assemblies discussed with respect to FIGS. 1-6.

In FIG. 7, the guide component 700 may be a guide plate (e.g., a second guide plate, etc.) and may include individual apertures 710 through which piston subassemblies may be disposed. For example, the guide component 700 may be used to guide seven piston subassemblies in the illustrated example, with six piston subassemblies forming a circular arrangement about a center piston subassembly. In some embodiments, the piston subassemblies may not be coupled to the guide component 700, and instead may be simply routed through respective apertures 710 to maintain spacing between the respective piston subassemblies. The guide component 700 may include a raised bracket 730, as depicted in opposite side view 720, that may be used to guide a portion of the center piston subassembly. Additional raised brackets may be included for other piston subassemblies, such as those forming the circular arrangement. A shell of the picking assembly may be coupled to the guide component 700 instead of individual piston subassemblies. For example, the shell may be coupled to raised brackets disposed about a perimeter of the guide component 700. The guide component 700 may therefore provide a fixed distance between each of the set of piston subassemblies and the center piston subassembly.

The coupling mechanism 740 may be used to couple a picking assembly to a robotic arm, a gantry, a vacuum source, or another component. The coupling mechanism 740 may include a number of components. For example, the coupling mechanism 740 may include a first portion 750, a second portion 760 configured to rotate about the first portion 750, and a third portion 770 configured to rotate about the first portion 750. The second portion 760 and the third portion 770 may be configured to rotate towards each other to secure the picking assembly, and rotate away from each other to release the picking assembly. A locking portion 780 may be coupled to the third portion 770 and may be configured to lock the coupling mechanism 740 in place, or to unlock the coupling mechanism 740 to remove the coupling mechanism 740. In the example of FIG. 7, the coupling mechanism 740 may be coupled to a plate 790, which may be the plate of a robotic arm, a gantry, a vacuum source, or another component. The coupling mechanism 740 may therefore facilitate rapid connecting and disconnecting of the picking assembly from various components.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
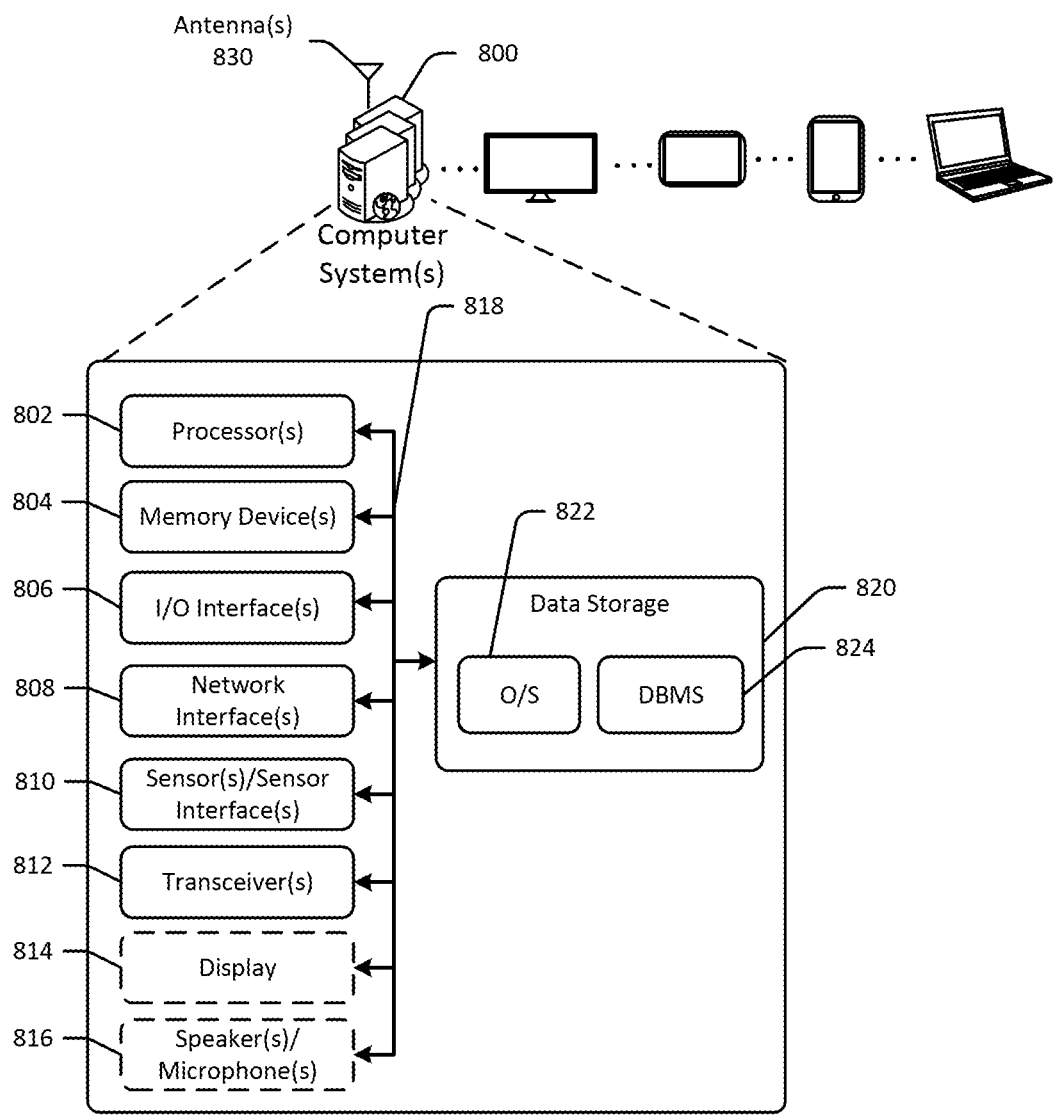
FIG. 8 schematically illustrates an example architecture of a computer system associated with an item picking system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the device(s) of FIGS. 1-7. For example, the computer system(s) 800 may control one or more aspects of the concentric suction cup tools with parallel pistons described in FIGS. 1-7, such as determining which piston subassemblies to extend or retract, where a robotic arm or other device is to position a picking assembly, and so forth.

The computer system(s) 800 may be configured to communicate with one or more servers, user devices, or the like. The computer system(s) 800 may be configured to identify items, retrieve items, move items, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the 0/S 822 may be loaded from the data storage 820 into the memory 804 and may provide an interface between other application software executing on the computer system(s) 800 and the hardware resources of the computer system(s) 800. More specifically, the 0/S 822 may include a set of computer-executable instructions for managing the hardware resources of the computer system(s) 800 and for providing common services to other application programs (e.g., managing memory allocation among various application programs). In certain example embodiments, the 0/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A robotic picking assembly comprising:
   a robotic arm;
   a vacuum suction system configured to provide positive air pressure and negative air pressure; and
   a picking assembly coupled to the robotic arm and the vacuum suction system, the picking assembly configured to pick up and release objects, the picking assembly comprising:
      a center piston subassembly comprising a first sliding rail, a first suction cup coupled to the first sliding rail, and a first air cylinder configured to actuate the center piston subassembly from a retracted position to an extended position, wherein the first sliding rail slides relative to the first air cylinder, wherein the center piston subassembly does not comprise a restrictor;
      a set of piston subassemblies arranged in a circular arrangement around the center piston subassembly, each piston subassembly in the set of piston subassemblies comprising a sliding rail, a suction cup coupled to the sliding rail, and an air cylinder configured to actuate the respective piston subassembly from a retracted position to an extended position, wherein the respective sliding rails slide relative to the respective air cylinders, wherein the set of piston subassemblies comprises individual restrictors to restrict air flow to the respective suction cups of the set of piston subassemblies;
      a first guide plate comprising individual apertures in which the center piston subassembly and the set of piston subassemblies are disposed, the first guide plate configured to provide a fixed distance between each of the set of piston subassemblies and the center piston subassembly; and
      a carbon fiber shell, wherein the center piston subassembly, the set of piston subassemblies, and the first guide plate are disposed in the carbon fiber shell, and wherein the carbon fiber shell is coupled to the first guide plate;
   wherein the picking assembly is configured to individually actuate individual piston subassemblies to the extended position to grasp an item, and wherein each individual piston subassembly is coupled to the vacuum suction system.

2. The robotic picking assembly of claim 1, further comprising:
   a controller configured to cause the picking assembly to pick up the item by:
      determining a subset of piston subassemblies to actuate;

causing the subset of piston subassemblies to actuate to the extended position;
positioning the subset of piston subassemblies adjacent to the item;
causing the vacuum suction system to provide negative air pressure; and
causing the picking assembly to move upwards.

3. The robotic picking assembly of claim 1, wherein the picking assembly further comprises:
a first airflow coupling adapter disposed at a distal end of the picking assembly, wherein the first airflow coupling adapter has a first configuration; and
a second airflow coupling adapter extending from the distal end of the picking assembly, wherein the second airflow coupling adapter has a second configuration.

4. A picking assembly comprising:
a first piston subassembly comprising a first air cylinder, a first sliding rail that slides relative to the first air cylinder, and a first suction cup, wherein the first piston subassembly is configured to independently actuate from a retracted position to an extended position;
a second piston subassembly comprising a second air cylinder, a second sliding rail that slides relative to the second air cylinder, and a second suction cup, wherein the second piston subassembly is configured to independently actuate from the retracted position to the extended position;
a first guide plate comprising a first aperture for the first piston subassembly and a second aperture for the second piston subassembly;
a shell that forms a housing for the picking assembly, wherein the shell is coupled to the first guide plate; and
an airflow coupler configured to couple the picking assembly to a vacuum suction system;
wherein the second piston subassembly further comprises a restrictor configured to restrict airflow, and the first piston subassembly does not comprise a restrictor.

5. The picking assembly of claim 4, wherein the first air cylinder is configured to actuate the first piston subassembly responsive to air pressure at the first air cylinder, and wherein the second air cylinder is configured to actuate the second piston subassembly responsive to air pressure at the second air cylinder.

6. The picking assembly of claim 4, wherein the first piston subassembly further comprises a first vacuum routing tube coupled to the first sliding rail, the first vacuum routing tube configured to provide suction at the first suction cup; and
wherein the second piston subassembly further comprises a second vacuum routing tube coupled to the second sliding rail, the second vacuum routing tube configured to provide suction at the second suction cup.

7. The picking assembly of claim 4, further comprising:
a first airflow coupling adapter comprising a first configuration; and
a second airflow coupling adapter comprising a second configuration.

8. The picking assembly of claim 4, wherein the first air cylinder and the second air cylinder are load bearing air cylinders, and wherein the shell is a load bearing shell.

9. The picking assembly of claim 4, further comprising:
a third piston subassembly comprising a third air cylinder, a third sliding rail that slides relative to the third air cylinder, and a third suction cup, wherein the third piston subassembly is configured to independently actuate from the retracted position to the extended position; and
a fourth piston subassembly comprising a fourth air cylinder, a fourth sliding rail that slides relative to the fourth air cylinder, and a fourth suction cup, wherein the fourth piston subassembly is configured to independently actuate from the retracted position to the extended position;
wherein the first piston subassembly is a center piston subassembly, and wherein the second piston subassembly, the third piston subassembly, and the fourth piston subassembly encircle the first piston subassembly.

10. The picking assembly of claim 4, further comprising:
a first valve configured to control airflow to the first air cylinder; and
a second valve configured to control airflow to the second air cylinder.

11. The picking assembly of claim 4, further comprising:
a second guide plate comprising a third aperture for the first piston subassembly and a fourth aperture for the second piston subassembly;
wherein the first guide plate is disposed adjacent to a first end of the picking assembly, the second guide plate is disposed adjacent to a second end of the picking assembly, and the first piston subassembly and the second piston subassembly are disposed in a parallel arrangement in the retracted position.

12. The picking assembly of claim 4, wherein the picking assembly is extendable in length by about 50%, and wherein the picking assembly has a weight-to-extended length ratio of between about 0.25 lb/inch and about 0.30 lb/inch.

13. The picking assembly of claim 4, further comprising:
a robotic arm coupled to the picking assembly and configured to move the picking assembly from a first location to a second location;
wherein the vacuum suction system is configured to generate negative pressure to pick up an item, and positive pressure to release the item.

14. A robotic picking system comprising:
a robotic arm; and
a picking assembly coupled to the robotic arm, the picking assembly comprising:
a first piston subassembly comprising a first air cylinder, a first sliding rail that slides relative to the first air cylinder, and a first suction cup, wherein the first piston subassembly is configured to independently actuate from a retracted position to an extended position;
a second piston subassembly comprising a second air cylinder, a second sliding rail that slides relative to the second air cylinder, and a second suction cup, wherein the second piston subassembly is configured to independently actuate from the retracted position to the extended position;
a first guide plate comprising a first aperture for the first piston subassembly and a second aperture for the second piston subassembly;
a shell that forms a housing for the picking assembly, wherein the shell is coupled to the first guide plate; and
an airflow coupler configured to couple the picking assembly to a vacuum suction system;
wherein the second piston subassembly further comprises a restrictor configured to restrict airflow, and the first piston subassembly does not comprise a restrictor.

15. The robotic picking system of claim 14, further comprising:
- a controller configured to cause the picking assembly to pick up an item by:
  - determining a subset of piston subassemblies to actuate;
  - causing the subset of piston subassemblies to actuate to the extended position;
  - positioning the subset of piston subassemblies adjacent to the item;
  - causing the vacuum suction system to provide negative air pressure; and
  - causing the picking assembly to move upwards.

16. The robotic picking system of claim 15, wherein the controller is further configured to:
- cause the vacuum suction system to provide positive air pressure to release the item.

17. The robotic picking system of claim 14, wherein the first air cylinder is configured to actuate the first piston subassembly responsive to air pressure at the first air cylinder, and wherein the second air cylinder is configured to actuate the second piston subassembly responsive to air pressure at the second air cylinder.

18. The robotic picking system of claim 14, wherein the first air cylinder and the second air cylinder are load bearing air cylinders, and wherein the shell is a load bearing shell.

* * * * *